United States Patent [19]

Blackburn

[11] 4,349,182
[45] Sep. 14, 1982

[54] TAPE-CONTROLLED METAL CUTTING APPARATUS

[75] Inventor: Marvin J. Blackburn, Laguna Niguel, Calif.

[73] Assignee: Vernon Tool Company Ltd., Oceanside, Calif.

[21] Appl. No.: 868,207

[22] Filed: Jan. 9, 1978

Related U.S. Application Data

[63] Continuation-in-part of Ser. No. 631,733, Nov. 13, 1975, abandoned.

[51] Int. Cl.³ .......................... B23K 7/04; B23K 37/04
[52] U.S. Cl. ................................ 266/57; 219/124.33; 266/59; 266/61; 266/76; 318/576; 318/577
[58] Field of Search .................. 266/48, 54, 55, 56, 266/57, 58, 59, 60, 61, 76, 77; 33/21 C; 318/576, 577; 219/124.1, 124.21, 124.22, 124.33, 124.34, 125.1, 125.11

[56] References Cited

U.S. PATENT DOCUMENTS

| | | | |
|---|---|---|---|
| 2,495,360 | 1/1950 | Young | 33/21 C X |
| 2,528,147 | 10/1950 | Jesonis | 33/21 C X |
| 2,726,450 | 12/1955 | Ware | 266/54 X |
| 2,876,650 | 3/1959 | Sangster | 266/59 X |
| 3,084,923 | 4/1963 | Arnault et al. | 266/60 |
| 3,153,109 | 10/1964 | Steventon et al. | 266/60 X |
| 3,228,671 | 1/1966 | Lyons | 266/59 X |
| 3,300,201 | 1/1967 | Atkinson | 266/59 X |
| 3,398,342 | 8/1968 | Redman | 266/76 X |
| 3,449,544 | 6/1969 | Kelling | 235/151.11 |
| 3,492,552 | 1/1970 | Usami et al. | 266/59 X |
| 3,591,157 | 7/1971 | Culp et al. | 266/54 |
| 3,614,077 | 10/1971 | Blackburn | 266/57 |
| 3,783,719 | 1/1974 | Gugliotta | 82/21 B |
| 3,900,346 | 8/1975 | Muller et al. | 266/57 |
| 3,936,714 | 2/1976 | Marshall et al. | 266/57 |

OTHER PUBLICATIONS

Machine Tool Technology 3rd Ed., McCarthy & Smith, (McKnight & McKnight-Bloomington, Ill.), 1968, p. 322.

Primary Examiner—Paul A. Bell
Attorney, Agent, or Firm—Christie, Parker & Hale

[57] ABSTRACT

Apparatus for cutting a metal workpiece including pipe in any desired shape and in a cutting cycle governed by a numerical controller having a plurality of separate output control signal channels. The apparatus is highly versatile and automatically operable to cut any preselected contour in accordance with control or program instructions carried on a control tape. In an illustrative embodiment of the cutting apparatus, a metal cutting torch is supported on a first support and the workpiece to be cut is mounted on a second support so arranged relative to the first support that the relative movement between the workpiece and the torch allows a cut to be made along X and Y axes at right angles to one another. The cutting torch is power driven about its own longitudinal or W axis by a reversible motor and is power driven about a fourth or Z axis to vary the bevel of the cut. The operation of these four power drives is controlled by a tape carrying a predetermined cutting program governing the operation of a numerical controller. The fidelity of the cut contour is monitored and controlled in part by automatic sensor means operable to maintain the cutting torch at a preselected distance from the workpiece. Separate workpiece supporting conveyor means are located to either side of the cutting station and include manually controlled power means operable to shift the workpiece past and relative to the cutting station as well as power means to shift the workpiece past the cutting torch while elevated above the linear transport portion of the conveyor.

42 Claims, 15 Drawing Figures

TAPE-CONTROLLED METAL CUTTING APPARATUS

This application is a continuation-in-part of my co-pending application for U.S. Letters Patent Ser. No. 631,733, filed Nov. 13, 1975 now abandoned entitled TAPE-CONTROLLED METAL CUTTING APPARATUS.

This invention relates to automatic metal cutting apparatus, and more particularly to apparatus for cutting metal by hot jet means with any of a wide range of preselected contours under the automatic control of a programmed cutting cycle carried on the control tape of a numerical controller.

BACKGROUND OF THE INVENTION

In recent years there has been unusual interest in providing more accurate, versatile and easily operated equipment and techniques for cutting metal plate and pipe with both simple and complex predetermined contours for many reasons including the many improvements which have been made in forming welded joints. To meet these demands designers have made many proposals for cutting metal to shape utilizing hot cutting jets. However, such proposals are subject to many shortcomings and disadvantages not satisfactorily avoided prior to the present invention. The problems have been particularly serious as designed for cutting thick workpieces including pipe used to form high-strength structures as, for example, submerged well drilling and producing platform and similar structures utilizing tubing of widely varying diameters and thicknesses welded together in an endless variety of patterns and arrangements. The great majority of the joints between components are of an endless non-standard variety which it is impractical to cut utilizing previously proposed mechanical contour generating equipment.

Typical prior art jet cutting devices for cutting metal are disclosed in Arnault et al. U.S. Pat. No. 3,084,923; Steventon et al. U.S. Pat. No. 3,153,109; Grubish U.S. Pat. No. 3,206,180; Lyons U.S. Pat. No. 3,228,671; Powers U.S. Pat. No. 3,330,547; Selkirk U.S. Pat. No. 3,552,731; Waldron U.S. Pat. No. 3,790,144; Hiratska U.S. Pat. No. 3,362,699; Redman U.S. Pat. No. 3,398,342; Usami U.S. Pat. No. 3,492,551; Inomata U.S. Pat. No. 3,819,162; Sekine et al. U.S. Pat. No. 3,843,103; Blackburn U.S. Pat. No. 3,430,938; Blackburn U.S. Pat. No. 3,614,077; Hooper U.S. Pat. No. 3,866,892; and Marshall U.S. Pat. No. 3,936,714.

Steventon et al. discloses a tape controlled cutter suitable only for plate stock cut along X and Y axes and lacking provision for cutting a bevel edge so important when torch-cut parts are to be welded together. The Grubish cutter is designed to cut pipe while rotated in a clamping buck and utilizing mechanical linkages the adjustment of which for each cut is difficult and time consuming to make and involving trial and error manipulations to check the correctness of each new setting. Powers, Selkirk and Waldron show various cutting devices of the tracer-controlled type wherein a different master is required to control travel of the cutting jet for each pattern to be cut. Hiratska proposes a cutter utilizing an analog electro-mechanical control incorporating a multiplicity of manually adjustable potentiometers and requiring a special control circuit for complex and nonstandard cuts. The pipe must be clamped in a rotating chuck while being cut and the cutting jet is preset at a selected angle at the outer end of a support rotating about a radial axis of the pipe undergoing cutting. This equipment is therefore limited to cutting holes in the sidewall of pipe since the bevel angle so important in making welded joints cannot be controlled properly. Usami and Lyons propose a three axis tape controlled metal cutter but each device is seriously limited by the fact that the cutting can be jet rotated only about an axis normal to the workpiece. Hopper's tape-controlled cutter lacks any provision for making bevel cuts. The three axis flame cutter of Inomata is specially designed for the final size-cutting of curved plates of variable thickness, such as the curved components of ship hulls, utilizing plural sensors in contact with the hull surface. The hull component undergoing cutting remains stationary and the cutting equipment is moved bodily while the several sub-assembly components of the apparatus are moved independently and relative to the component being cut. Sekine et al. also deals with the problem of bevel cutting of both plate stock and layered ship hull components of varying thickness in such manner as to maintain the remote bevel edge in a straight line as well as to regulate the spacing of the torch from the stock. His equipment lacks means for varying the bevel angle without departure from a desired predetermined remote-side contour as well as means for tilting the cutting torch about an axis tangent to this predetermined remote-side contour. His torch positioning means requires sensing rollers in contact with the opposite sides of the workpiece and this is obviously impractical in cutting large stock and long pipe. The two Blackburn patents disclose three axis pipe cutters each using a manually settable mechanical linkage in combination with eccentrics to control and generate each cutting pattern of the cutting torch. Marshall's flame cutting apparatus is controlled by a pair of optical scanners which follow the respective front and rear traces of the cut to be made, the traces being mounted on a drum rotating in timed relation to the rotation of the pipe being cut. His system is constructed and controlled in accordance with quite different principles requiring accurate determination of the tangent of the bevel being cut axially of the pipe at each circumferential increment about the girth of the pipe. He further requires two feed back loops as well as a circumferential scan line around the pipe, all cooperating to compensate for creep. Additionally, he has no provision for maintaining the torch at a predetermined distance from the surface of the pipe to compensate for out-of-roundness so commonplace in large diameter pipe.

SUMMARY OF THE INVENTION

The many shortcomings and disadvantages of the aforementioned and other previously proposed hot jet metal cutting equipment are avoided by the present invention. The illustrative embodiment of the invention disclosed herein is arranged for cutting thick-walled pipe varying in roundness and in diameter from a few inches to several feet and of the type widely used in pipe lines and in welded structural assemblies. However, it will be understood that the principles of the invention are equally applicable to cutting plate stock by replacing the X-axis pipe rotating sub-assembly with any suitable type of X-axis stock reciprocating means. Typically, the cutting station is located between the aligned ends of power driven conveyors designed to transport the stock or workpiece linearly or, alternatively, to rotate the stock while being cut. In either arrangement the stock rests on support means confined to the underside thereof leaving all upper portions thereof freely accessible for inspection, handling and cutting operations.

The cutting jet, which may be fuel-fed or a plasma jet, is adjustably supported on a power driven coordinatograph operable to shift the cutting jet lengthwise and vertically of the workpiece as other power means moves the workpiece in a transverse direction. Other power driven means operate to pivot the cutting jet in a vertical place passing through the workpiece to control or vary the bevel angle of the cut while still another motor operates to shift the jet axially of itself. To compensate for out-of-roundness, there is provided automatic monitoring and sensing sub-assembly mounted adjacent the cutting jet and operable to maintain the jet spaced at the optimum distance from the workpiece for accurate cutting as cutting proceeds. This is accomplished by sensing the spacing between the nozzle for the cutting jet and the workpiece and utilizing a sensed change in the spacing to adjust the nozzle and its support toward or away from the pipe surface by the requisite distance to assure that the contour of the cut along the remote face of the workpiece will lie along the desired line.

In a first described embodiment, tilting the jet about an axis tangent to the remote edge of the cut to vary the bevel of the cut can bring the jet into contact with the pipe or workpiece and damage both the equipment and possibly the workpiece as well. This can be avoided by a second programming mode wherein a constant distance is maintained between the exterior of the pipe and the axis of the jet tip. When using this second mode, as distinguished from the first mode wherein the axis of shaft 35 lies substantially tangent to the inner contour of the cut, the jet is adjusted vertically until the axis of shaft 35 intersects the jet axis at the plane of the tip orifice. To maintain the authenticity of the contour as the bevel of the cut varies it is necessary to compensate the programmed Y value by a predetermined value which increases with an increase in the bevel angle and decreases with a decrease in the bevel angle. The first mode of pivoting the cutting jet has the advantage of simplifying preparation of the program and of the tape controlling operation of the numerical controller, but the second mode has the decided advantages of maintaining the jet as a constant distance from the workpiece, eliminates risk of injury to the torch and workpiece, and facilitates initial adjustment of the jet irrespective of the workpiece thickness.

Movement along the W, X, Y axes and in a plane normal to a plane parallel to the X, Y axes is controlled automatically by a tape operated numerical controller having provision for over-riding this controller when and if necessary by a manually mainpulatable controller operable to interrupt the automatic cutting cycle at any stage as well as to position the workpiece for a cutting cycle, and other operations not requiring the automatic controller. When the workpiece and the equipment components are properly positioned, a single initiating signal suffices to start a preprogrammed automatic cutting cycle which includes turning on the sensors, starting fuel and oxygen flow, activating the igniter briefly, controlling the preheating oxygen flow followed by shifting to the cutting flow rate, blow through of the workpiece in a salvage area thereof and then advancing the cutting jet to the zero starting point of the cut and continuing through a complete cutting cycle and deactivation of the cutting jet at the conclusion of the cut. Any number of cutting cycles can be performed upon the same piece including both ends and any number of intermediate points if desired anywhere along the length of a very long workpiece including pipe of standard 44 foot length. All instructions for each cut are prestored on the control tape. Any of the innumerable differing contours can be cut in quick succession merely by snapping a cartridge of control tape onto the capstan of the tape reader which tape contains the necessary program instructions for that cut. No mechanical adjustments of any kind are required except manipulation of the manual control box buttons to position the workpiece for the next cut.

Accordingly, it is a primary object of this invention to provide a unique, highly versatile, tape controlled apparatus for automatically cutting a workpiece along any desired set of either bevelled or non-bevelled contours.

Another object of the invention is the provision of apparatus using a hot jet to cut a workpiece in an automatically controlled cutting cycle from program data stored on a tape.

Another object of the invention is the provision of improved apparatus for cutting thick-walled pipe with either a fixed or varying bevel and the inner edge of which bevel is precisely controlled for efficient highly effective welding to another bevel-edged component.

Another object of the invention is the provision of apparatus for cutting a bevel edge of any desired contour on either flat or curved stock by cutting jet means pivotal about an axis tangent to the inner contour of the cut.

Another object of the invention is the provision of hot jet cutting apparatus wherein the cutting jet is pivotable about an axis transversely of its orifice while supported at a constant distance from the workpiece thereby to make a cut having a varying bevel.

Another object of the invention is the provision of a tape-controlled metal cutting apparatus programmed to make a bevelled usually non-linear cut by a jet pivoting about an axis generally coincident with the remote edge of the cut to be made while maintained at a substantially constant predetermined distance from the surface of the workpiece adjacent the jet.

Another object of the invention is the provision of automatically controlled metal cutting apparatus for making contoured variable bevel cuts by a pivoting cutting jet shiftable axially of itself opposite a workpiece shiftable in directions at right angles to one another.

Another object of the invention is the provision of tape-controlled metal cutting apparatus for making a contoured cut of varying bevel wherein the cutting jet pivots about its outlet orifice while being shifted crosswise of the cut by a correction factor $\Delta y$ wherein $\Delta y = (t+k)(\tan A + \tan B)$.

Another object of the invention is the provision of pipe cutting apparatus having power driven means for moving the pipe horizontally and linearly as well as for rotating it without creep about its own axis while being cut by a hot jet and which jet and pipe transport means are controlled by a program recorded on a control tape.

Another object of the invention is the provision of cutting and shaping means for pipe and other elongated workpieces supported from the underside thereof on linear conveyor means disposed to either side of a cutting jet and including means for rotating the workpiece about its longitudinal axis while being cut.

These and more specific objects will appear upon reading the following specification and claims and upon considering in connection therewith the attached drawing to which they relate.

Referring now to the drawing in which a preferred embodiment of the invention is illustrated.

Referring initially more particularly to FIGS. 1-5, there is shown an illustrative embodiment of the invention, designated generally 10, having a four axis cutting station 11 positioned between a plurality of motor driven conveyor sections 12, 12 aligned with one another to either side of the cutting station. The two conveyor sections 12 most remote from one another are located between conveyors 13, 13 extending from either side thereof and operable to supply pipe to either side of conveyors 12 as well as to remove pipe which has been cut from either side thereof.

The control system for the cutting apparatus includes a tape operated numerical controller 14, a remote control console 15, and a limited number of manually operable controls 16 located at the cutting station proper. Each of the controls at 15 and 16 are useful in making certain adjustments independently of controller 14.

Figures 3, 15:
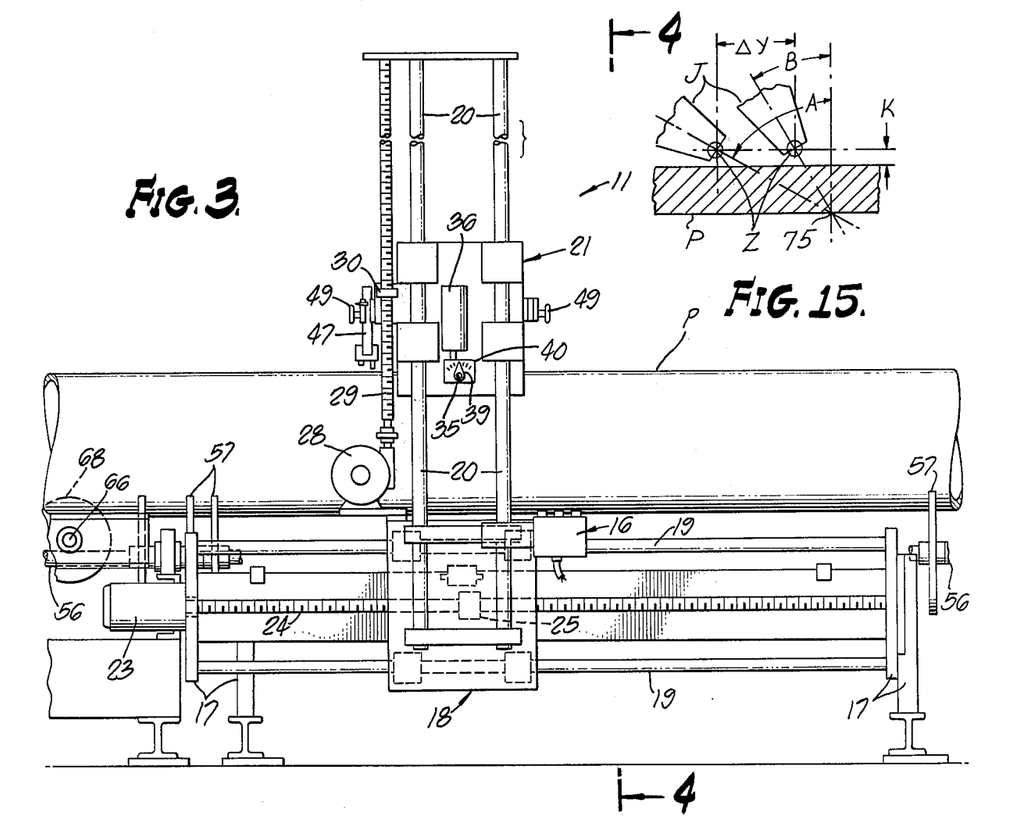
FIG. 3 is a front elevational view of FIG. 2.
FIG. 15 is a diagrammatic view depicting the correction factor used to modify movement of the cutting jet along the Y axis when tilting the jet from bevel angle A to bevel angle B about a pivot axis passing through the jet orifice.
Figure 4:
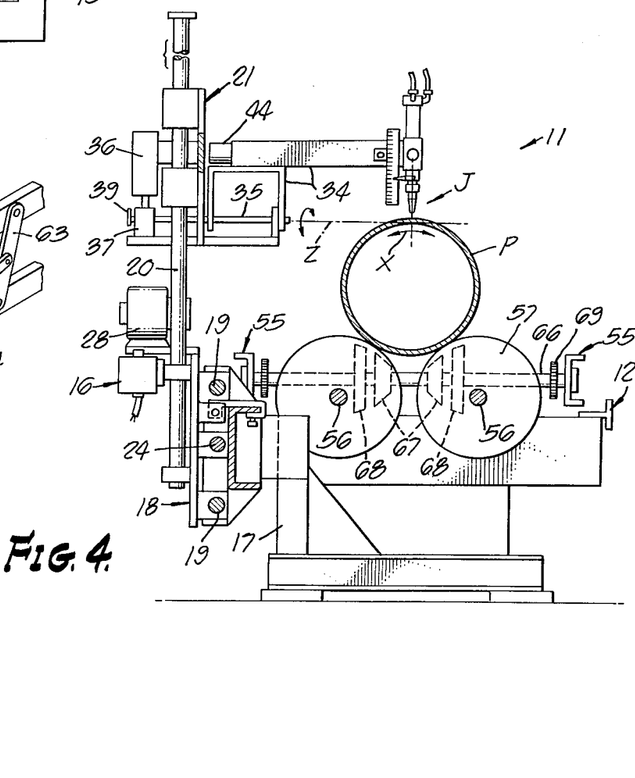
FIG. 4 is a cross-sectional view taken along line 4—4 on FIG. 3.

The cutting operations are conducted along two axes X, Y at right angles to one another and at a desired angle to a plane parallel to the X and Y axes. The cutting jet J is supported by a coordinatograph, as will be described in detail presently, for movement along a Y axis extending longitudinally of conveyor sections 12, 12. The X axis of movement occurs transversely of the pipe by reason of the rotation of the pipe P about its longitudinal axis. Tilting movement of the jet is provided by power means tilting jet J about a Z axis whereas axial movement of the jet along a fourth or W axis is provided by power means 44. As shown in FIG. 4, the Z axis is tangent to the I.D. of the pipe adjacent and intersecting the longitudinal axis of jet J, but in the modification shown in FIG. 15 the Z axis passes diametrically through the jet orifice.

Cutting jet J is mounted on a coordinatograph having a first horizontally movable carriage 18 (FIGS. 4 and 6) slidably supported along the horizontal guide rods 19,19 rigidly supported on pedestals 17,17 forming part of the main frame of the cutting station 11. Projecting upwardly from and fixed to carriage 18 are a second pair of guide rods 20,20 slidably supporting a vertically movable second carriage 21 (FIG. 3). Carriage 18 is driven by a stepping or servo motor 23 having its shaft coupled to a precision screw 24 operating through a nut 25 fixed to carriage 18. The vertically movable second carriage 21 is shifted along rods 20,20 by a reversible d.c. motor 28 driving a vertical screw 29 operating through a nut 30 fixed to carriage 21.

Figure 1:
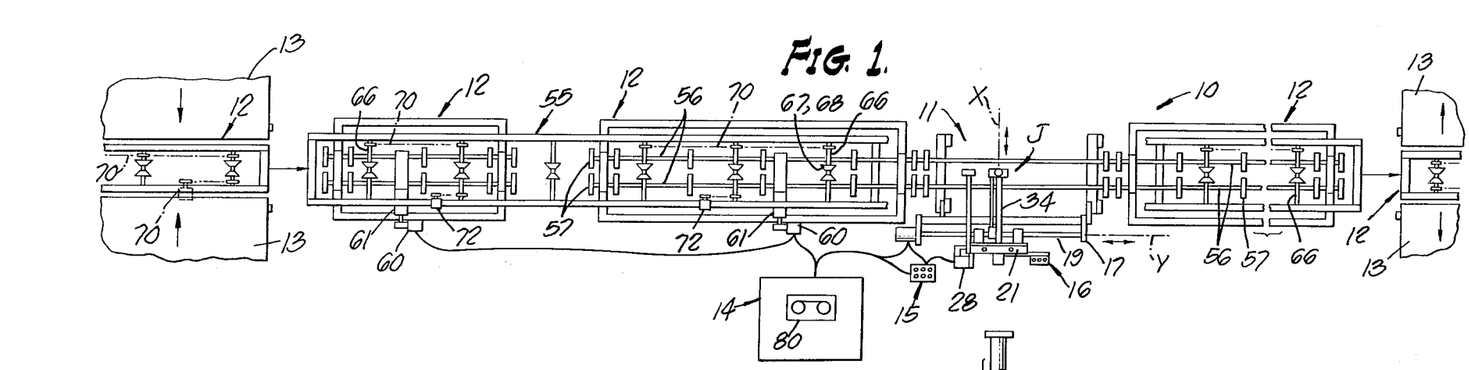
FIG. 1 is a top plan view of an illustrative embodiment of the invention cutting apparatus constructed and arranged to cut pipe.
Figure 2:
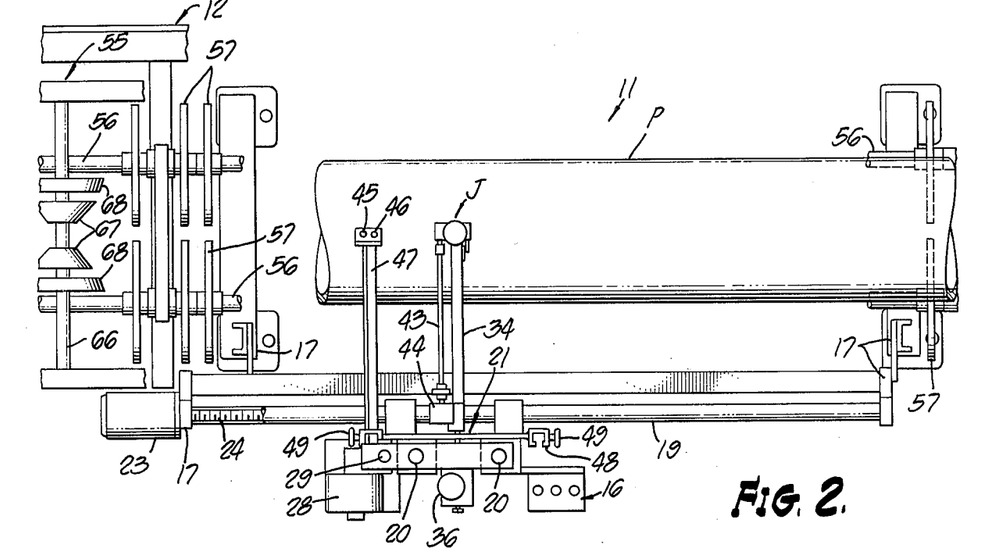
FIG. 2 is a top plan view of the cutting station and the adjacent section of the workpiece conveyor portions of which are broken away to better show parts of the cutting station.

The cutting jet J is adjustable lengthwise of itself and crosswise of the outer end of an L-shaped supporting bracket 34 the vertical leg of which is rigidly fixed to the horizontal supporting shaft 35 journalled in vertical carriage 21. The axis of shaft 35 constitutes the Z axis of the cutting station. Shaft 35 and the jet supporting bracket 34 are rotated by a stepping or servo motor 36 supported on vertical carriage 21 and coupled to shaft 35 by a worm and worm gear 37, best shown in FIGS. 6 and 7. As best appears from FIG. 3, a pointer 39 fixed to the front end of shaft 35 is movable over a scale 40 fixed to carriage 21 to indicate the angular position of the cutting jet the axis of which, as shown in FIGS. 2 and 3, lies normal to pipe P while supported on conveyors 12 in readiness for cutting.

Jet J includes suitable means for adjusting it crosswise of the end of bracket 34 such as a rack and pinion driven by the shaft 43 (FIG. 2) of a stepping or servo motor 44 mounted on the jet support bracket 34 and normally operable by numerical controller 14 to raise and lower the jet depending on the angle of the bevel being cut in the workpiece. Motor 44 is also controllable manually independently of controller 14 from control switches on console 15 or from a second manual control panel at cutting station 16. The width of the cut being made in material of uniform thickness increases as the bevel angle increases. To obtain satisfactory and efficiently made cuts along contours of widely varying bevels in a thick workpiece, as between say an unbevelled length of cut and a length of cut bevelled at 60°, it is advantageous to space the jet outlet at different distances from the workpiece surface. For example a spacing of about one half inch provides excellent results for an unbevelled cut and decreasing to one quarter inch as the bevel increases to 60° achieved automatically by controller 14 as cutting proceeds.

Figures 6, 8, 9, 10:
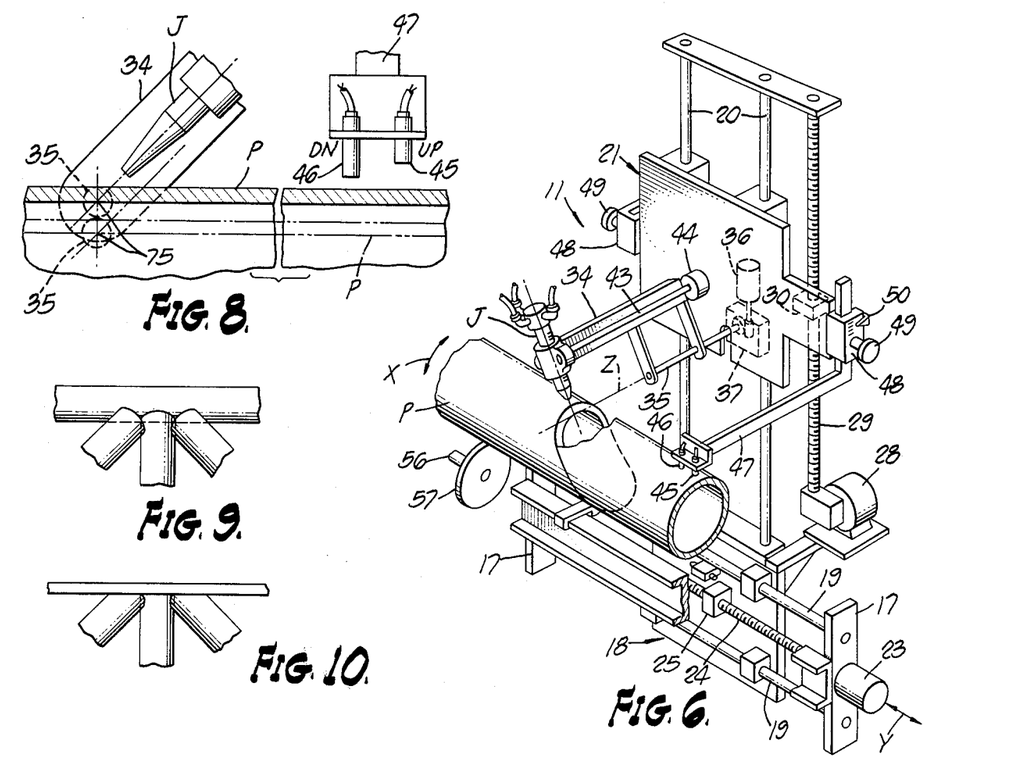
FIG. 6 is a fragmentary perspective view taken from the rear side of the cutting station showing components of the cutting station in position at the start of a typical pipe cutting cycle.
FIG. 8 is a fragmentary cross-sectional view on an enlarged scale showing the jet and sensor adjusted for cutting bevel contours and indicating in dot and dash line how the sensor operates to lower the jet supporting carriage to maintain the jet axis in position to intersect the pivot axis of the jet supporting carriage if the pipe settles to an out-of-round condition.
FIGS. 9 and 10 are fragmentary elevational views the first of which shows a plurality of pipes intersecting one another in complexly contoured junctions and the second of which shows a plurality of pipes intersecting one another and a plate in a second type of complexly contoured junctions, all of which can be accurately cut by the apparatus of this invention.
Figure 7:
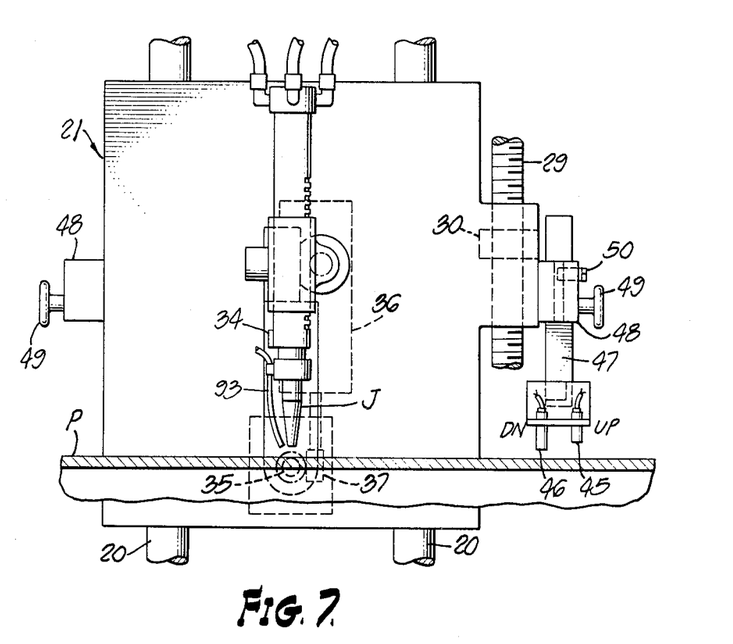
FIG. 7 is a fragmentary rear elevational view on an enlarged scale of the cutting jet showing the torch and sensor in readiness to start a pipe cutting cycle with the cutting jet in a vertical position.

The d.c. motor 28 operable to adjust carriage 21 vertically along rods 20, 20 is controlled in a manner to be described presently by up and down sensors 45, 46 supported adjacent jet J on a vertically adjustable bracket 47 (FIGS. 6 and 7). Bracket 47 is L-shaped and its upright leg is slidably supported in duplicate holders 48 fixed to either lateral edge of vetical carriage 21. Holder 48 is provided with a clamping knob 49 to clamp bracket 47 in any adjusted position. A vertical scale on the face of holder 48 cooperates with a pointer 50 carried by bracket 47 to indicate the position of sensors 45, 46 relative to the workpiece undergoing cutting and relative to the axis of shaft 35, it being recognized that bracket 47 can be adjusted to maintain the axis of shaft 35 at a selected position relative to either the upper or the lower surface of the workpiece opposite the cutting device J.

It will be understood that sensors 45, 46 are of a well known commercially available type, such as those manufactured by Minneapolis-Honeywell and designated by that supplier as Model FMS A5-50. Each contains a microswitch connected in circuit with a suitable amplifier and power supply to control a respective relay controlling the power supply to a reversible motor 28 controlling the vertical movement of the carriage 21 along guide rods 20.

As is clearly shown in FIGS. 7 and 8, sensors 45, 46 are rigidly supported in slightly different positions relative to the upper surface of the workpiece. The contacts of the "up" relay 45 are normally open and those of the "down" relay 46 are normally closed. When bracket 47 is clamped in the position shown in FIGS. 6 and 8, the two sensors are in a proper or null position with respect to the workpiece, the carriage driving motor 28 is deactivated and jet J is supported in a fixed or optimum cutting position. If, however, the workpiece surface varies from this optimum position as cutting proceeds, the one or the other sensor will operate its relay to energize the reversing motor 28 in the proper direction to compensate for the change in spacing. As soon as the spacing error has been corrected motor 28 is instantly deenergized to hold the jet in its new properly adjusted position. Although FIG. 6 shows bracket 47 adjusted so that the sensors are effective to maintain the intersection of the torch axis and the Z axis on the I.D. of the pipe, it will be apparent that the bracket can be adjusted so that the point of intersection of these same axes is on the O.D. of the pipe P or other workpiece. According to a first preferred mode of use, the Z axis is aligned to intersect the cutting flame axis of jet J on the under surface of the workpiece or at the I.D. of a pipe as is illustrated in FIG. 6. However, according to a second mode of use illustrated in FIG. 15, the Z axis is adjusted to intersect the axis of the jet orifice at a predetermined distance from the adjacent or near surface of the pipe or workpiece. This mode of use has the decided advantage that the torch remains spaced from the workpiece regardless of the steepness of the cut bevel.

Suitably journalled in the base sections 12, 12 are a pair of long parallel shafts 56 supporting a plurality of workpiece supporting rollers 57 for rotating the workpiece about its own axis. Shafts 56 are parallel to one another and sufficiently long to support the major length of the pipe. These shafts rotate in synchronism in sets of bearings in true axial alignment and, in consequence, there is no tendency of the pipe to "creep" as respects one or more of the drive rollers 57. Creep is a troublesome problem for the correction of which compensating feedbacks are unnecessary with the pipe rotating expedients employed in this invention and, in consequence, rejects caused by creep are avoided. Shafts 56 are rotated by respective sets of worms and worm gears 58, 58 driven by shafts 59 and a respective stepping or servo motor 60. In this connection it will be understood that each of the conveyor sections 12, 12 preferably includes at least one motor 60 connected to drive an associated pipe rotating shaft 56 in either direction. Each shaft 59 and set of drive gears are enclosed in a suitable housing 61.

Figure 5:
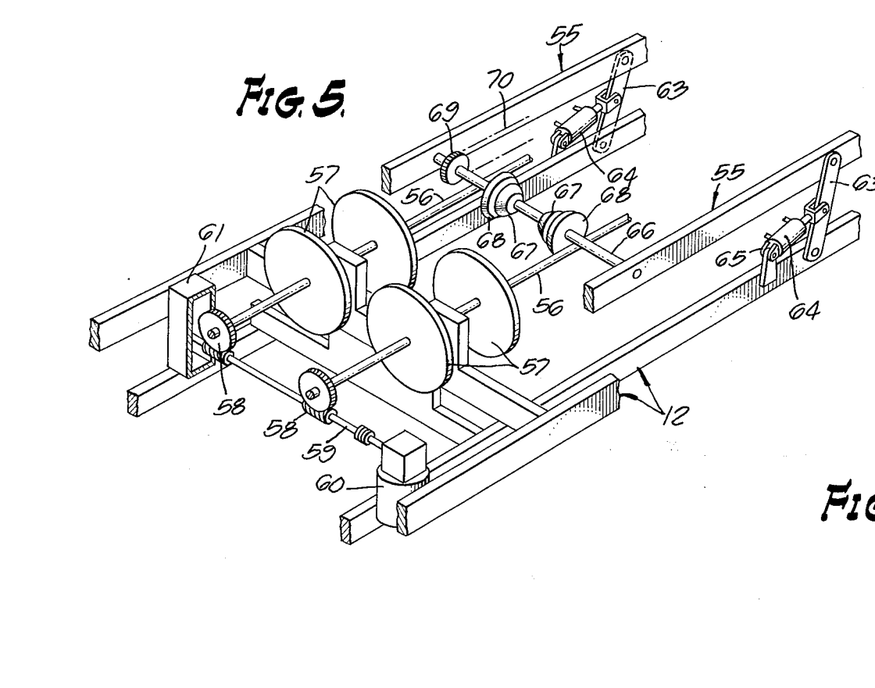
FIG. 5 is a fragmentary perspective view of the conveyor with portions broken away and showing the linear pipe conveying rollers in a retracted position as they are in FIG. 4.

The pipe transport subassembly 55 of the conveyor system includes a rigid rectangular frame here shown as extending substantially the full length of the cutting apparatus and as overlying a plurality of conveyor sections 12,12. Cradle frame 55 is connected to the main frame at intervals by pairs of links 63 (FIG. 5). Only one pair of links 63 is shown in the drawing but it will be understood that pairs of these links are located at intervals along the length of cradle 55. The links 63 are pivoted in unison in any suitable manner, as by the hydraulic cylinders 64 having one end 65 pivoted to the main frame of conveyor sections 12 and the outer ends of their piston rods connected to a midlength portion of links 63.

Extending crosswise of cradle 55 at intervals are shafts 66 each keyed to a pair of small diameter bevelled rollers 67 and to a pair of outer larger diameter bevelled rollers 68. The shafts 66 and the rollers 67,68 are interconnected by sprockets 69, drive chains 70 (FIGS. 1 and 5), and one or more reversible drive motors 72 to drive the rollers and transport pipe resting thereon lengthwise of the conveyor.

As clearly appears from FIGS. 4 and 5, shafts 66 supporting the conveyor transport rollers 67,68 overlie and extend crosswise of shafts 56 supporting the pipe rotating rollers 57. When the supporting cradle 55 is in its lowered position shafts 66 are closely spaced above the upper sides of shafts 56 so that the peripheries of rollers 67,68 are spaced slightly below the peripheries of rollers 57. Accordingly, it is only necessary to elevate cradle frame 55 a relatively short distance to raise rollers 67,68 into contact with a pipe P. These smaller diameter rollers 67 are closer to the center line of the cradle and are employed to elevate smaller diameter pipe undergoing cutting whereas the larger diameter rollers 68 are engageable with larger diameter pipe such as that illustrated in FIG. 4. The proportions of the rollers shown herein are equally effective in handling pipe varying in diameter from three to forty-eight inches.

Referring to FIG. 8, the manner in which the sensors 45, 46 operate to control the motor 28 governing the position of the vertical-movable, jet-supporting carriage 21 will be described. Let it be assumed that jet J is inclined to approximately 45° to cut pipe P with a 45° bevel edge. In the full line showing of the pipe, it will be observed that the jet axis intersects the Z axis on the I.D. of pipe P. The result is that the inner contour of the bevel being cut is closely adjacent and tangent to the Z axis. This is because the bracket 47 supporting the microswitches housed within the up sensor 45 and the down sensor 46 can be adjusted to operate motor 28 to shift carriage 21 until the axis of shaft 35 supporting the torch intersects the longitudinal axis of the cutting torch J on the I.D. of the pipe. It is well known that most steel pipe is not perfectly round and that the larger diameter pipes are considerably out of round while supported horizontally from their underside as is indicated by the pair of dot and dash horizontal lines in FIG. 8. This settling of the top side of the pipe representing a typical out of round condition is sensed by the monitoring sensor 46 which operates the "up" relay 102 controlling the power to motor 28 and energizes this motor to operate in the proper direction to lower carriage 21 and jet J until the Z axis, the axis of shaft 35, is restored or maintained tangent to the I.D. of the pipe and vertically below its former position. As this position is reached sensor 46 deactivates the motor and holds carriage 21 firmly in this position until one or the other of sensors 45,46 senses a change in the elevation of pipe P.

It will therefore be evident that sensors 45,46 continuously monitor the position of the pipe relative to the jet and operate to move the jet up or down to maintain the Z axis constantly tangent to the I.D. of the pipe at the point of cutting, and this is true irrespective of any change occurring in the inclination of the jet supporting bracket 34 relative to the pipe axis. For this reason the inner edge or contour 75 of the edge being cut is maintained true and accurate and in accordance with the predetermined program for this contour edge despite irregularities with out of round conditions which may exist in the pipe.

In a second mode of operation illustrated in FIG. 15, jet J is adjusted so that the Z axis about which the jet pivots is located a predetermined distance from the adjacent surface of workpiece P. This distance which is designated K in FIG. 15 depends upon the type of jet employed and the type of nature of the metal being cut. If the jet utilizes fuels and oxygen the operator will usually space the center of the jet orifice between $\frac{1}{8}''$ and $\frac{1}{2}''$ from the workpiece. If on the other hand he is utilizing a plasma jet the spacing is of the order of $\frac{3}{8}''$ to $\frac{5}{8}''$. A typical spacing for either type is about $\frac{1}{4}''$. When pivoting jet J about an axis extending transversely of the jet outlet, it will be understood that the programmed tape governing the operation of controller 14 usually includes no signals to motor 44 with the result that this motor remains quiescent and does not shift the jet along the W axis.

As pointed out above in connection with FIG. 8, the remote edge 75 of the contour being cut is usually the edge of critical importance. In order to maintain the axis of the cutting jet at the desired edge 75 despite a change in the bevel angle it is necessary to introduce a compensating factor $\Delta Y$ into the programmed Y axis values. This value increases with an increase in the bevel angle and decreases with a decrease in the bevel angle. For example, if the bevel angle changes from A to B in FIG. 15 as the axis of the jet orifice remains at the constant height K above the surface of the workpiece P, the correction factor $\Delta Y$ algebraically added to the carriage travel Y is expressed as follows:

$$\Delta Y = (t+K)(\tan A - \tan B)$$

where
t = thickness of workpiece
K = spacing of jet orifice center from the workpiece surface
A = old angle of jet axis and plane normal to workpiece
B = new angle of jet axis and plane normal to workpiece.

This mode of bevelled contour cutting enables one to make high angle cuts without risk of injury to the jet, the workpiece or the equipment generally. Moreover, as will be apparent from a consideration of FIGS. 8 and 15, either mode of programming assures that the edge of the cut on the remote side of the workpiece from the cutting jet will be true and in accurate accord with the programmed contour.

It will be understood that sensors 45,46 are utilized with both the first and the second modes of programming and function in the same manner with each mode.

As is well known, the inner or root edge of a welded joint is critically important since the edges of the two parts being welded together should meet as closely as possible along their respective mating inner contour edges. The bevel angle itself may vary widely from point to point around the periphery of the cut to provide appropriate access for welding since the wider portions of this welding gap may be readily filled with welding material provided the inner contour edges of the parts are sufficiently closed to prevent loss of the molten metal during initial stages of the welding operation.

Figure 11:
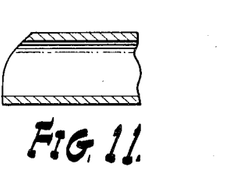
FIGS. 11, 12 and 13 are fragmentary cross-sectional views showing other typical cuts which can be made in pipe by the apparatus of this invention.
Figure 12:
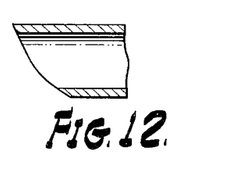
Figure 13:
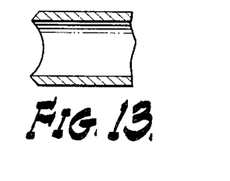

FIGS. 9 and 10 are merely illustrative of typical contours which are readily cut in pipe to facilitate welding several pipes and plates to one another. Likewise, FIGS. 11 to 13 are cross-sectional views of pipe the ends of which have been bevel cut by the cutting apparatus disclosed herein. In each the cut edge is bevelled progressively differently along different sectors and varies from an edge lying radially of the pipe to one inclined acutely to the pipe axis to either side. It will be understood that if the edge lies to one side of a radial plane it is a negative bevel whereas it is a positive bevel if disposed on the opposite side of a radial plane. Each edge is defined by an inner contour and an outer contour respectively coincident with the inner and outer surfaces of the pipe.

OPERATION

Figure 14:
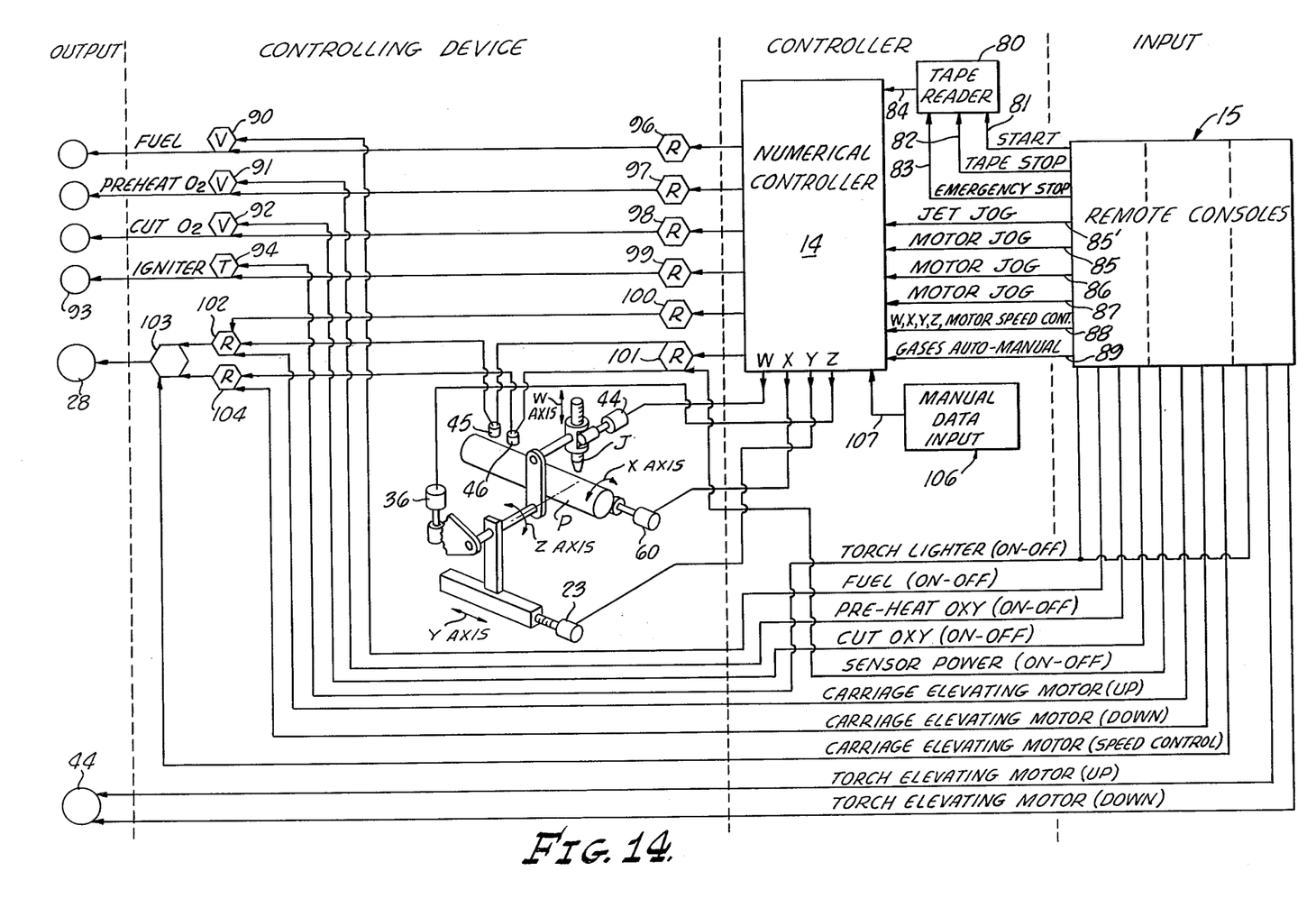
FIG. 14 is a schematic block diagram of the control connections between the controller and the various other components of the equipment connected therewith.

The operation of the above described cutting apparatus will be described in connection with the schematic block diagram of the control system illustrated in FIG. 14. The numerical controller 14 includes a tape reader 80 having connections 81, 82, 83 with control buttons located on the remote control console 15. Depressing the control button for lead 81 initiates operation of the tape reader to release the program control signals into controller 14 along the input channel 84. Closing the button for lead 82 stops the tape reader temporarily for inspection or the like, whereas depressing the control button of the emergency signal lead 83 operates to deactivate the cutting cycle then in progress thereby necessitating restarting that entire cutting cycle.

Each of the leads 85 through 89 are connected to respective control buttons on the face of console 15. The buttons controlling leads 85, 86, 87 are individually operable to jog a respective one of the X axis motor 60, the Y axis motor 23, and the cutting tool adjusting motor 36. The control button for lead 88 is effective to vary synchronously the speed of each of these motors. The control button for lead 89 is a two-position switch which conditions the fuel, oxygen and igniter components for either manual or automatic control. Thus, if this control button is moved to the automatic position, each of the above mentioned components is rendered controllable solely by controller 14, whereas if the control button is in the manual position the operator may control each of these components either from console 15 or from control buttons and switches in parallel therewith and located at the cutting station. It is pointed out that the fuel supply to the cutting jet is controlled by a solenoid valve 90, the preheat oxygen by solenoid 91, the cutting oxygen by a solenoid valve 92, and the electrical igniter 93 mounted on the jet by a transformer 94. If the two-position control button for lead 89 is in the auto position, then controller 14 turns the fuel on and off by latching relay 96, turns the preheat oxygen on and off by the latching relay 97, turns the cutting oxygen on or off by the latching relay 98, and turns igniter 93 on momentarily by activating time delay relay 99.

The controller also turns the power supply for sensors 44,45 on or off by latching relay 101. If the power supply for the sensor is on, then, at the end of the cutting cycle, the controller automatically provides a control signal to the time delay relay 100 which activates relay 102 to provide a control signal to the d.c. motor control 103 for the carriage elevating motor 28, which operates to move this carriage along with the cutting jet upwardly away from the pipe by a predetermined distance to facilitate movement of the pipe to a new cutting position without risk of injury to the cutting jet.

At the start of a new cutting cycle the controller sends a signal to relay 101 and thence to the down relay 104 to activate motor control 103 to reverse the operation of carriage motor 28 to position the jet J for the next cutting cycle. When the jet is in proper position as sensed by the down sensor 46, relay 101 is de-energized thereby stopping motor 28.

The manual data input console 106 includes separate controls for introducing any desired correction data into the controller 14 and thence to any selected one or more of the X, Y, Z axis motors 60, 23 and 36. For example, if the operator observes that a particular cut being made exhibits a minor error involving one or more of the X, Y and Z axes, he first operates the tape stop button on console 15 to stop the cutting operation temporarily. He then operates first one and then the other of the X and Y manual jog controls on console 106 until the components are in a desired new position. This having been done, he restarts the automatic cutting operation merely by pressing the start button to send a signal along lead 81 to the tape reader.

It will be understood that the automatic cycle includes instructions on the tape for initiating operation of a cutting cycle with the jet positioned slightly removed from the zero starting position, and typically in a location restricted to the salvage portion of the pipe. Typically, this displacement is about one inch. Initiating of the automatic program cycle then activates operation of the jet, including ignition of the fuel, flow of preheated oxygen, followed by shifting to regulation of the oxygen for cutting. A predetermined time is then allowed for blow through following which the program shifts the jet about one inch to the starting position and thereupon manipulates the jet and shifts the pipe along the X axis and the jet along the Y axis in accordance with the predetermined cutting program recorded on the tape as the tape is fed past the decoding head of the taper reader.

It will be understood that the cutting program typically includes rotation of the pipe about its X axis for one half of the cut following which the controller automatically restores the pipe near the initial zero cutting position beneath the jet and then rotates the pipe in the reverse direction for the remainder of the cutting cycle. At the end of this cutting cycle the controller automatically elevates the torch away from the pipe and turns off the fuel and oxygen until the pipe is properly positioned in readiness for the next cutting cycle.

Other operators prefer to program the controller through a complete cutting cycle without reversing the rotation of the pipe. Either mode of operation is performed equally expeditiously by the invention cutting apparatus merely by recording the appropriate cutting program on the tape. The first mode of operation reduces any error in the program by approximately one half the error likely to result if the cut is made in a single uninterrupted cutting cycle with the pipe rotation continuously in one direction.

It will be apparent from the foregoing that a single length of pipe 44 feet long may be cut with many different contours at any number of different locations at any selected point along its length as determined by respective cutting programs recorded sequentially on a single length of tape. Alternatively, each cut may be recorded on a separate tape carried in a separate cartridge. In this event it is merely necessary to substitute one cartridge for another when going from one cut to the next.

To move the pipe from one cutting position to another the operator merely operates the cradle elevating cylinders 64 to raise cradle 55 until the pipe is free of rollers 57 and fully supported on the smaller or larger pair of conveyor transport rollers 67 or 68. Motors 72 driving conveyor transport rollers 67,68 are then energized in the appropriate direction to reposition the pipe lengthwise of the conveyor. Once in a selected new position motors 72 are deactivated and cradle 55 is lowered by operation of linear motors 64 to restore the weight of the pipe onto the pipe rotating rollers 57. Any necessary refinement in the adjustment of the jet is then made by manipulating the jog switches controlling the operation of the X and Y motors 68, 23.

After the desired number of cuts have been made in a given length of pipe, the conveyor transport rollers 67, 68 are activated to move the pipe to a discharge position between conveyors 13,13 at the right hand end of the equipment as additional pipe to be cut is introduced onto the left hand end of the conveyor system.

While the particular tape-controlled metal cutting apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Automatic apparatus for cutting a workpiece by a hot jet directed against one face thereof comprising:
   (a) means for supporting a workpiece horizontally;
   (b) hot jet means and support means therefor supported on said apparatus essentially and substantially independently of a workpiece to be cut and positioned to direct a cutting jet against one face of a workpiece supported by said workpiece support means, said hot jet means including power driven means for moving said hot jet means bodily toward and away from said workpiece;
   (c) first and second power-operated means for moving both of said support means relative to each other to enable said hot jet means to cut said workpiece along X and Y axes lying in a common plane at right angles to one another;

(d) third power-operated means for pivoting said hot jet means in an arc lying in a plane generally normal to said common plane containing said X and Y axes thereby to cut the workpiece at different bevel angles relative to said one face;

(e) preprogrammed numerical control means providing a series of control signals to said first, second and third power-operated means whereby said hot jet means is effective to cut the workpiece along a preselected contour including non-linear portions and along preselected different bevel angles during a cutting cycle; and (f) sensing means for automatically monitoring the position of the pivot axis of said jet means relative to the surface of said workpiece and for continuously sensing the proximity of the pivot axis of said jet means to said workpiece and including power means for shifting said jet means as necessary to maintain the pivot axis of said jet means at an optimum cutting position relative to the workpiece.

2. Cutting apparatus as defined in claim 1 wherein the sensing means comprise sensors out of contact with the workpiece and the power means shift said jet means as necessary to maintain the pivot axis of said jet means substantially in a predetermined position relative to said surface of the workpiece during a cutting cycle.

3. Cutting apparatus as defined in claim 1 wherein said sensing means are mounted for movement in unison with said support means for said jet means, said sensing means being sensors positioned closely adjacent said jet means and on the same side of the workpiece as said jet means, and the apparatus further includes control means operatively connected to said jet support means and automatically operable to maintain the pivot axis of said jet means in a preselected cutting position relative to said workpiece.

4. Cutting apparatus as defined in claim 3 characterized in the provision of manually adjustable means for adjusting the position of said sensing means to position the pivot axis of said jet means to lie adjacent a selected one of the surfaces of a workpiece to be cut.

5. Cutting apparatus as defined in claim 3 characterized in that said sensing means is supported out of contact with the workpiece while the same is undergoing cutting by said jet means.

6. Cutting apparatus as defined in claim 3 characterized in that said sensing means includes first and second sensors supported different distances from the same face of a workpiece, and said control means being responsive to the first of said sensors to move said jet means away from the workpiece and responsive to the second of said sensors to move said jet means toward the workpiece and ineffective to move said jet means in either direction when said sensors are in a null position from the adjacent face of the workpiece.

7. Cutting apparatus as defined in claim 1 characterized in the provision of fourth power-operated means for moving said hot jet means axially thereof governed by control signals received from said preprogrammed numerical control means.

8. Cutting apparatus as defined in claim 7 characterized in the provision of independently operable manual control means for each of said power-operated means individually useable to jog a selected one thereof at any time independently of said numerical control means.

9. Cutting apparatus as defined in claim 7 characterized in that said numerical controller means is operable to transmit control signals to said third and fourth power operated means to change the axial and angular positions of said jet means to cut bevels of different angles relative to the surface of the workpiece.

10. Apparatus for cutting a workpiece with an edge suitably bevelled for welding to a metal member lying at an angle to said first member, said apparatus comprising:

(a) hot jet cutting means;

(b) first and second power-driven means for supporting a workpiece horizontally while moving said workpiece and said hot jet cutting means relative to one another as said hot jet means cuts a slot through said workpiece;

(c) third power-driven means for adjusting said hot jet cutting means bodily toward and away from said workpiece;

(d) fourth power driven means for pivoting said hot jet means in a plane generally normal to the nearest face of said workpiece and about an axis extending substantially diametrically through the outlet port of said hot jet means;

(e) preprogrammed numerical control means controlling said first, second and fourth power-driven means for moving said hot jet means said numerical control means including tape means having control instructions thereon and transducer means for reading said instructions and transmitting separate control instructions to the pivoting means for said hot jet means and to the power driven means and said workpiece relative to one another and adjusting the pivotal movement of said hot jet means as cutting proceeds to cut a slot in said workpiece having a predetermined non-linear contour lengthwise of said slot and with the sidewalls of said slot inclined at predetermined varying angles; and (f) sensing means supported on power driven support means for said jet means and operable to sense the spacing of said jet means from the workpiece undergoing cutting, and power operated means responsive to said sensing means operable to move said jet means as necessary to maintain the pivot axis thereof substantially uniformly positioned relative to one surface of said workpiece while undergoing cutting.

11. Cutting apparatus as defined in claim 10 characterized in the provision of power controlled means for moving said jet means parallel to the surface of said workpiece while cutting a slot therethrough which power means is operatively connected to and controlled by said numerical control means.

12. Cutting apparatus as defined in claim 10 characterized in that said apparatus is operable to progressively cut a slot having at least one predetermined contour in a tubular workpiece while said workpiece is resting by gravity generally horizontally on said power-driven support means.

13. Cutting apparatus as defined in claim 12 characterized in that said apparatus includes control means constructed and adapted to cut any selected number of slots in sequence each having a predetermined contour in a tubular workpiece supported generally horizontally.

14. Cutting apparatus as defined in claim 10 characterized in that said numerical control means is operable to initiate blow through of said workpiece by said jet means in a waste portion of the workpiece and for then advancing the cut automatically to the starting point of the slot being cut and then proceeding to cut a slot having said predetermined contour.

15. Cutting apparatus as defined in claim 10 characterized in the provision of manually operable control means for interrupting the operation of said preprogrammed numerical control means at any time for a period of time to inspect and service any component of said apparatus in need of service and for thereafter resuming the operation of the remainder of the cutting cycle.

16. Cutting apparatus as defined in claim 10 characterized in that said power-driven means supporting said workpiece includes power-driven conveyor means operable to move a tubular workpiece to and fro longitudinally thereof past said jet means while said jet means is deactivated and for positioning a selected portion of said tubular workpiece in proper position for a cutting operation by said jet means.

17. Cutting apparatus as defined in claim 16 characterized in that said power means for moving said tubular workpiece and said jet means relative to one another comprises power driven rollers located in a row along the opposite undersides of the tubular workpiece undergoing cutting, and a common shaft supporting the respective rows of said rollers and effective to rotate said tubular workpiece free of creep.

18. Cutting apparatus as defined in claim 16 characterized in that the power-driven conveyor means for moving said tubular workpiece past said jet means includes power means operable to support said tubular workpiece clear of said conveyors independently of said means while said tubular workpiece undergoes cutting.

19. Cutting apparatus as defined in claim 18 characterized in that said conveyor means for shifting said tubular workpiece lengthwise thereof comprises aligned cradle means underlying said tubular workpiece on the opposite sides of said jet means operable to raise and lower the workpiece from and back onto said power means for moving the workpiece relative to said jet means while undergoing cutting.

20. Cutting apparatus as defined in claim 18 characterized in that said jet means is operable to make a variably bevelled contoured cut while any portion of a long tubular workpiece is positioned adjacent said jet means.

21. Cutting apparatus as defined in claim 20 characterized in that said means for supporting said tubular workpiece clear of said conveyor means while being cut by said jet means includes workpiece supporting portions to either side of said jet means cooperable to support the opposite end portions of said tubular member while undergoing cutting.

22. Cutting apparatus as defined in claim 21 characterized in that the portions of said means for supporting said tubular workpiece clear of said conveyor means are located on the opposite sides of said jet means and are selectively operable to support said tubular member from either side of said jet means while contour cutting a portion of either selected end portion thereof.

23. Apparatus for automatically cutting pipe along a desired bevelled contour comprising:
  (a) a cutting station located intermediate the remote ends of long horizontally disposed conveyor means having aligned sections located one to either side of said cutting station and each of said sections having first and second portions operable selectively to move pipe longitudinally past said cutting station and to rotate pipe about the axis thereof.
  (b) said cutting station being equipped with power-driven pipe cutting jet means bodily adjustable toward and away from the pipe generally radially thereof and having first motor driven means for moving said jet means lengthwise of said conveyor means and second motor driven means for pivoting the axis of said jet means in a plane lying in the axis of said pipe to vary the bevel of the cut;
  (c) third motor driven means for shifting the pipe vertically out of contact with said first portion of said conveyor means and into contact with said second portion of said conveyor means;
  (d) fourth motor driven means for driving said second portion of said conveyor means to rotate the pipe above the axis thereof;
  (e) preprogrammed numerical control means connected to said power-driven pipe cutting jet means and to said first, second and fourth motor means for automatically controlling each in such manner that said jet means cuts pipe along a predetermined desired bevelled contour; and
  (f) monitoring sensor means positioned adjacent said jet means free of contact with the pipe and movable with said jet means radially of the pipe, said sensor means including fifth motor driven means for adjusting said jet means radially of the pipe in either direction under the control of said preprogrammed numerical control means and automatically operable to maintain the pivot axis of said jet means in a predetermined position relative to the surface of the pipe in accordance with control signals from said sensor means.

24. Apparatus as defined in claim 23 characterized in that said jet means is supported on said second portion of said conveyor means on either or on both sides of said cutting station and is operable to cut pipe along selected predetermined contours.

25. Apparatus as defined in claim 23 characterized in that one of said first and second portions of said conveyor means includes power driven vertically shiftable cradle means for moving pipe lengthwise of said conveyor means and for moving pipe lengthwise of itself past said cutting station.

26. Apparatus as defined in claim 25 characterized in that said second portion of said conveyor means includes a plurality of rollers mounted on separate parallel shafts and cooperating to support and rotate the pipe without creep from the underside thereof and each rotatable in unison in either direction by said fourth motor means.

27. Apparatus as defined in claim 25 characterized in the provision of a plurality of said cradle means including at least one of said cradle means on each side of said jet means.

28. Apparatus as defined in claim 27 characterized in the provision of a plurality of said fourth motor driven means including one on each side of said jet means operable in synchronism with one another to rotate said pipe under the control of said numerical control means.

29. Apparatus as defined in claim 23 characterized in the provision of fifth motor-driven means for automatically moving said jet cutting means axially thereof under the control of said preprogrammed numerical control means when cutting a slot at a varying bevel to the surface of the workpiece.

30. Apparatus as defined in claim 29 characterized in the provision of manual control means for each of said motor driven means operable independently of one another and independently of said numerical control means to jog any one of said motor driven means before and after beginning a cutting cycle.

31. Tape controlled apparatus for cutting pipe with pre-determined bevel-edged contours comprising:
   (a) first power-driven support means for supporting and rotating both short and long lengths of pipe about the axis thereof and which support means underlies said pipe;
   (b) coordinatograph means supported in an upright position along one lateral side of said pipe support means and including a power driven first carriage movable lengthwise of said pipe support means and a second power driven carriage secured to said first carriage and movable at right angles to the path of movement of said first carriage;
   (c) hot jet means mounted on said second carriage means and positionable to cut a slot in pipe resting on said pipe support means adjacent said jet means, said hot jet means including automatic means for moving the same toward and away from the pipe to maintain said hot jet means in a predetermined position relative to the pipe as cutting proceeds, and
   (d) tape controlled numerical control means connected to said first power driven pipe rotating means and to the power driven means for said first and second power driven carriages and operable to control the same as said jet means cuts the pipe along a desired predetermined bevel-edged contour.

32. Pipe cutting apparatus as defined in claim 31 characterized in the provision of third motor driven means for pivoting said jet means in a radial plane lying in the plane of the pipe axis and connected to said numerical control means and operable thereby to vary the bevel angle of the slot cut by said jet means as cutting progresses in said desired predetermined pattern.

33. Pipe cutting apparatus as defined in claim 32 characterized in that said jet means is supported on bracket means journalled on said second carriage on an axis extending crosswise of said pipe and crosswise of the outlet of said jet means, and said tape for said numerical controlled means being preprogrammed to introduce a correction factor $\Delta Y$ in the control signal to said power driven second carriage where $\Delta Y = (t+K)(\tan A - \tan B)$.

34. Pipe cutting apparatus as defined in claim 31 characterized in that said jet means includes means for feeding combustible gases thereto, igniter means for said gases, and means operable by said tape controlled numerical control means for initiating and terminating the operation of said gas feeding means and said igniter means during each pipe cutting cycle of operation.

35. Pipe cutting apparatus as defined in claim 31 characterized in that said combustible gas feeding mean includes fuel feeding means and preheat oxygen feeding means and cutting oxygen feeding means each connected to said tape controlled numerical control means for automatic control thereby.

36. Cutting apparatus as defined in claim 31 characterized in the provision of sensor means movable toward and away from the workpiece undergoing cutting along with said hot jet means and including power driven means for maintaining said sensor means and said hot jet means at a preselected distance from the adjacent surface of the pipe during a cutting cycle.

37. Pipe cutting apparatus as defined in claim 31 characterized in that said numerical control means is operable to control a complete cutting cycle including means to reverse said fourth motor driven means to rotate the pipe in first one and then the other direction during the respective halves of a cutting cycle.

38. Apparatus for automatically flame cutting a workpiece along a desired variable bevel contour comprising:
   (a) elongated main frame means for supporting a workpiece having a workpiece cutting station provided with flame cutting jet means;
   (b) first power driven means for pivoting said jet means about an axis transversely of the outlet of said jet means and in a plane generally normal to the adjacent face of the workpiece and transversely of the cut to be made to vary the bevel of the cut;
   (c) second power driven means for moving said jet means lengthwise of said main frame means;
   (d) third power driven means for moving said workpiece transversely of the path of movement of said jet means while said jet means is being moved by said second power driven means;
   (e) fourth power driven means for moving said jet means toward and away from said pipe; and
   (f) preprogrammed numerical control means connected to said first, second, third and fourth power driven means operable to govern the movement of each of said power driven means in discrete increments as cutting progresses thereby to cut a workpiece along a preselected variable bevel contour including automatically increasing and decreasing the magnitude of the discrete increments of movement of said second power driven means in unison with changes in the bevel angle of the cut being made by said jet means and as necessary to provide a cut the remote edge of which has a preselected shape despite changes in the bevel angle at different points along the cut.

39. Apparatus for flame cutting as defined in claim 38 characterized in the provision of sensor means supported adjacent one face of the workpiece operable to control said fourth motor driven means in either direction as necessary to maintain said jet means substantially uniformly spaced from the face of said workpiece during active cutting operations.

40. Apparatus for flame cutting as defined in claim 38 characterized in said provision on said main frame means of power driven workpiece conveyor means operable to move a workpiece into and out of cutting position at said cutting station without interfering with the movement of the workpiece relative to said cutting jet means during a cutting cycle on the workpiece.

41. Apparatus for flame cutting as defined in claim 38 characterized in the provision of manually operable means for independently controlling the operation of each of said first, second third and fourth motor driven means independently of said preprogrammed numerical control means.

42. Apparatus for flame cutting as defined in claim 41 characterized in the provision of means for deactivating said preprogrammed numerical control means at any time during a cutting cycle to permit manual adjustment of any one of said first, second and third motor driven means and then resuming automatic operation of the unfinished portion of the cutting cycle.

* * * * *